W. C. C. BALL.
BAKE-PANS.

No. 185,472.  Patented Dec. 19, 1876.

Witnesses.
William E. Baldwin
Joseph Mo. Russell

Inventor
William C. C. Ball
by George Verly
Attorney

UNITED STATES PATENT OFFICE.

WILLIAM C. C. BALL, OF ANSONIA, CONNECTICUT.

IMPROVEMENT IN BAKE-PANS.

Specification forming part of Letters Patent No. 185,472, dated December 19, 1876; application filed May 31, 1876.

*To all whom it may concern:*

Be it known that I, WILLIAM C. C. BALL, of Ansonia, in the town of Derby, in the county of New Haven, and State of Connecticut, have invented a new and Improved Baking-Pan; and I do hereby declare the following to be a full, clear, and exact description of the invention, such as will enable others skilled in the art to which it pertains to make and use it, reference being had to the accompanying drawing, which forms a part of this specification.

My invention relates to a baking-pan; and consists in making a pan with two bottoms, the upper bottom being removable, the central portion of the lower bottom being cut out nearly to the sides of the pan, the remaining part forming a margin, on which the upper removable bottom rests.

The object of the invention is a pan more particularly intended for baking cake, from which the cake can be readily removed when baked, and which obviates the trouble of lining pans with paper for the purpose of more readily removing their contents.

Figure 1:
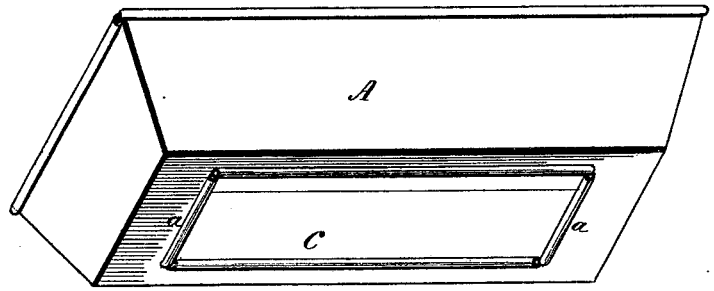
Figure 2:
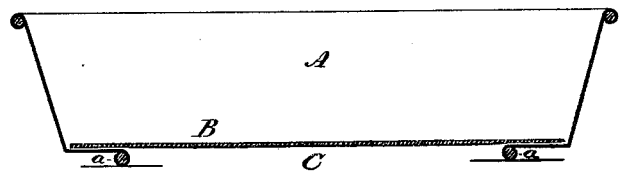
Figure 3:
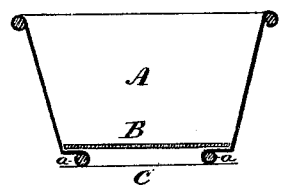

Figure 1 is a view of the pan turned in a position to show the opening in its lower bottom. Fig. 2 is a longitudinal, and Fig. 3 is a cross, section of the pan.

My pan is made in the usual way, and in the usual form of pans for baking cake, and differs in no respect except in the construction of its two bottoms.

Fig. 1 is a view of the pan A turned in a position to show the portion C of the lower bottom which is cut out, and the remaining part or margin $a\ a$, on which the upper removable bottom rests. The inner edge of the margin is turned round a wire in the same way in which the upper edges of pans are turned. The wire serves to stiffen the bottom, and also to raise it above the oven-bottom, whereby burning of the cake is prevented, and more even baking is secured.

Fig. 2 is a longitudinal section of the pan, showing a section of the upper removable bottom B resting on the margin $a\ a$. The upper removable bottom B is a piece of tin cut to fit on the lower bottom of the pan, as shown in Figs. 2 and 3. Fig. 2 also shows a section of the wire on the inner edge of the lower bottom.

Fig. 3 is a cross-section of the pan, and shows the same parts which are shown in Fig. 2.

The pan being thus constructed and made, a thin knife being passed between the baked cake and the sides of the pan, and the pan turned over, the cake and upper removable bottom will come out together, when, if necessary, the knife may be passed between the cake and the removable bottom, and the bottom removed, the cake being unbroken.

I claim as my invention—

The herein-described baking-pan, having two bottoms, the upper bottom being a removable and flat piece of sheet metal, the central portion of the lower bottom being cut out nearly to the sides of the pan, its inner edge being turned round a wire on its under side to stiffen the bottom and raise it above the oven-bottom, the remaining part forming a margin, on which the upper removable bottom rests, the said pan constructed and made substantially as shown and described.

WILLIAM C. C. BALL.

Witnesses:
 THEODORE P. TERRY,
 SAMUEL M. BLAIR.